United States Patent [19]

Bagwell

[11] Patent Number: 4,773,219
[45] Date of Patent: Sep. 27, 1988

[54] HYDRAULIC DRIVE SYSTEM

[75] Inventor: Maury L. Bagwell, Carrollton, Ga.

[73] Assignee: Blastcrete Equipment Company, Anniston, Ala.

[21] Appl. No.: 76,942

[22] Filed: Jul. 23, 1987

[51] Int. Cl.⁴ .................. F60K 17/10; F60K 25/00
[52] U.S. Cl. ................................ 60/484; 60/698; 180/305; 180/308
[58] Field of Search .............. 60/698, 484; 180/242, 180/305, 308

[56] References Cited

U.S. PATENT DOCUMENTS 3,900,075  8/1975  Chichester et al. ............ 180/242 X
4,069,886  1/1978  Campbell et al. ................... 180/308

Primary Examiner—Allen M. Ostrager
Attorney, Agent, or Firm—Jennings, Carter, Thompson & Veal

[57] ABSTRACT

A hydraulic drive system utilizes four hydraulic motors arranged in mechanically coupled pairs with one motor from each pair always series hydraulically connected to one motor from the other pair. The other motors are selectively coupled parallel with each other or in series with the series connected motors. The combination of mechanical and hydraulic coupling provides an efficient drive system designed specifically for, but not limited to, the motor grader apparatus. The improved drive system herein disclosed provides both high speed-low power and low speed-high power operational modes and is capable of continuous operation in either mode. The improved drive system also provides superior control characteristics due to the hydraulic motor series lockup arrangement. The combination of mechanical and hydraulic coupling provides high power with good control or high speed with little heating of the hydraulic fluid.

8 Claims, 4 Drawing Sheets

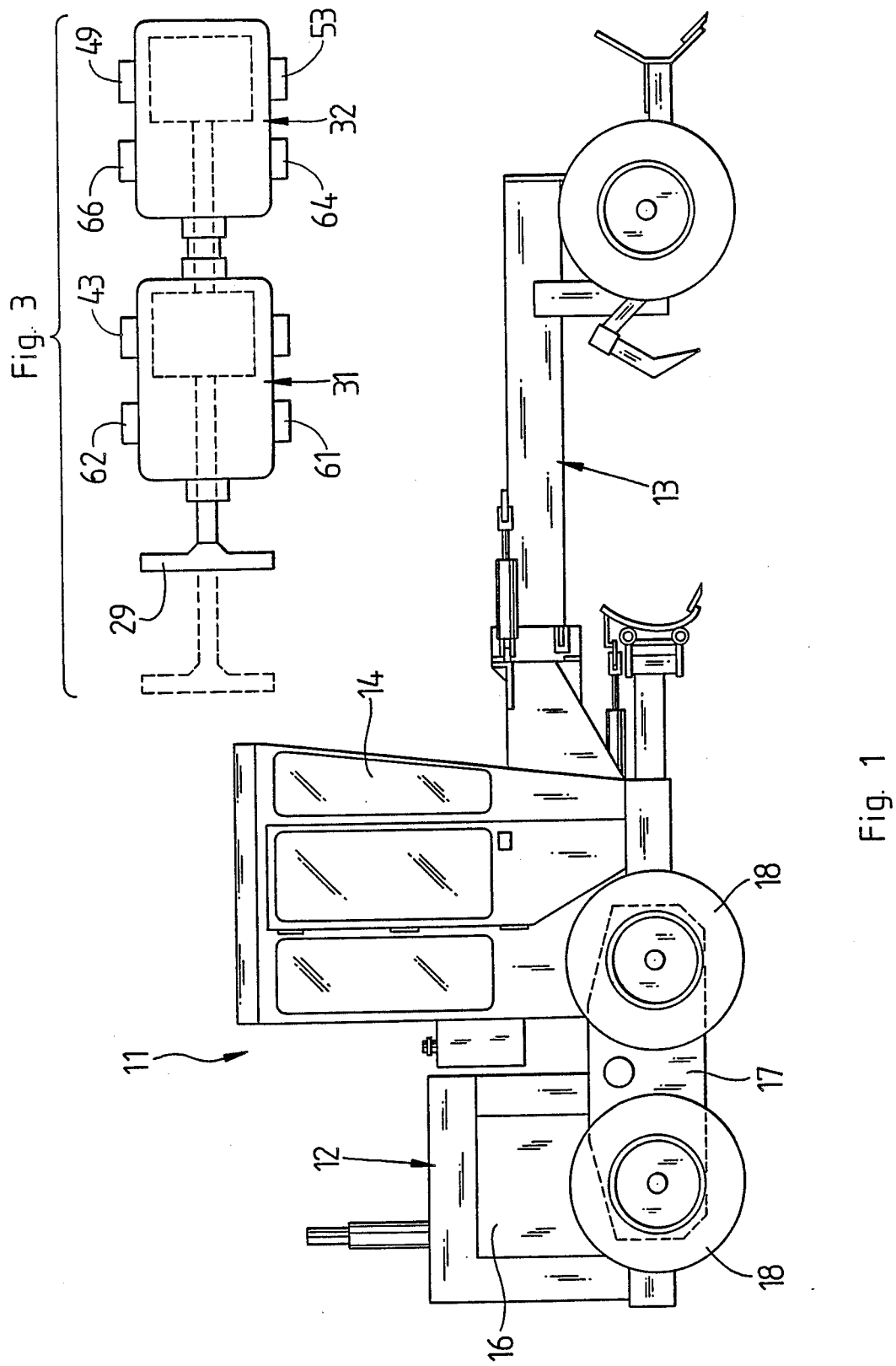

HYDRAULIC DRIVE SYSTEM

FIELD OF THE INVENTION

The present invention relates to hydraulic drive systems and more particularly to a dual range hydraulic drive system employing hydraulic and mechanical coupling. Even more particularly the present invention relates to a hydraulic drive system for coupling a plurality of cross axle drive motors for synchronous operation in both a low speed and high speed operation.

BACKGROUND OF THE INVENTION

Prior art drive systems for mobile motor graders and the like have consisted of various mechanical and hydraulic drive systems; however satisfactory drive systems have not been found which can be used in such devices to provide a low speed high power drive and a high speed low power drive, without the creation of excessive heat in high speed operation. The excessive heat built up in hydraulic systems when operated at high speeds prevents such devices from maximizing their utility. Furthermore, this heating problem means that graders and the like with such drive systems are not self-transportable, and cannot be used for low power high speed projects.

SUMMARY OF THE INVENTION

It is the object of this invention to provide an improved hydraulic drive system for a mobile grader apparatus.

A more specific object of this invention is to drive a plurality of hydraulic motors in such a way as to provide a dual range of speed as well as a positive drive system as required by apparatus such as a mobile motor grader.

Another object of the invention is to provide a drive unit which provides the above advantages without excessive heating in the high speed operation.

These and other objects and advantages are accomplished in my invention through a unique combination of hydraulic and mechanical means which provide a drive system capable of meeting the diverse requirements of propulsion of motor grader type apparatus. Specifically, my apparatus allows the unit to be operated at low speed with high power for grading and leveling; high speed at low power for rapidly traversing to and from work areas; and wheel lock-up for stable operation in slippery and uneven areas.

My drive system utilizes four hydraulic motors driven from a single driven hydraulic transmission. The hydraulic motors are paired with one pair driving the wheels on the right side of the grader apparatus or vehicle and the other pair driving the wheels on the left side of the vehicle. The motors in each pair are mechanically linked for synchronous motion and are mechanically coupled to the wheels such that the wheels are also synchronously driven. In the low speed configuration, one motor from each pair is series connected with one from the other pair with the remaining two motors being driven in parallel. In the high speed mode, three of the motors are serially connected for concomitant motion while the fourth is carried by its mechanical couple. An operator is able to select either speed mode remotely by the movement of a selector switch.

BRIEF DESCRIPTION OF THE DRAWINGS

Apparatus embodying features of my invention are depicted in the accompanying drawings which form a portion of this invention and wherein:

FIG. 1 is a side elevation of a motor grader of the type which may employ my drive system;

FIG. 3 is a view of a exemplary selector switch;

DESCRIPTION OF A PREFERRED EMBODIMENT

Figure 2A:
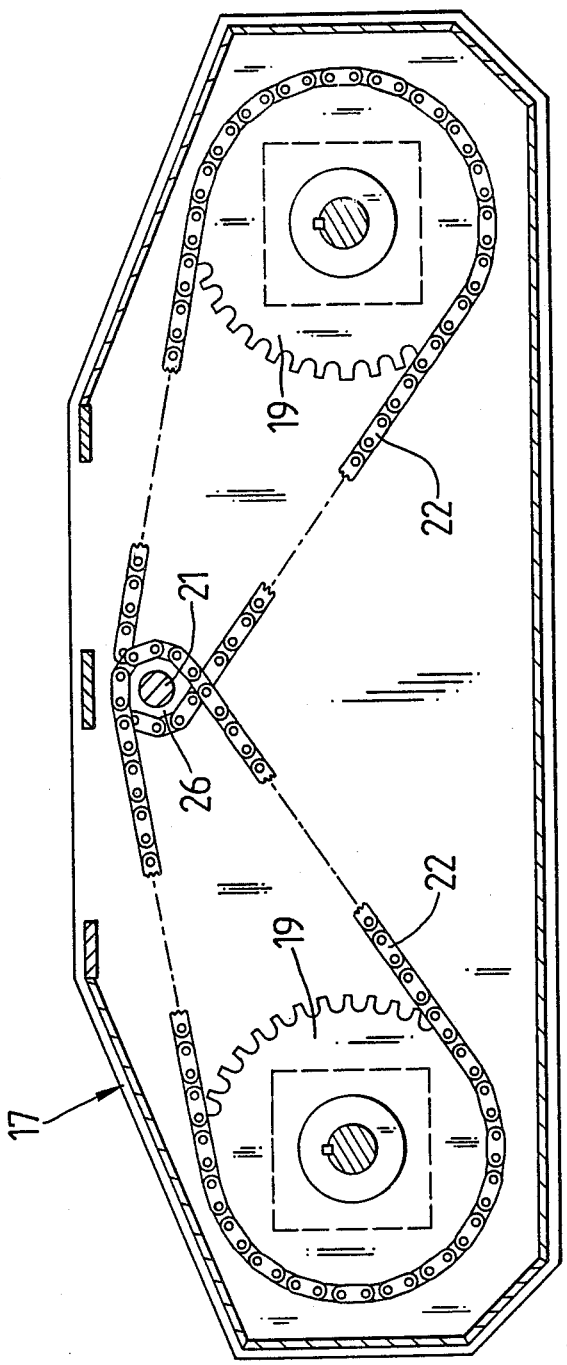
FIG. 2a is a sectional side elevation of the mechanical coupling of a pair of motors to the drive shafts of their wheels.

FIG. 1 depicts a motor grader 11 which may utilize my invention. The grader 11 includes a rear power section 12 and a forward work section 13. It will be appreciated that the forward section 13 may take on a variety of configurations other than a grader and still be utilized with the rear power section 12 wherein by invention is utilized. The rear section 12 includes an operators cabin 14 from which the vehicle is operated; a motor compartment 16, a gearbox 17 for each set of wheels, the wheels 18, and my invention which is not visible in FIG. 1.

Figure 2B:
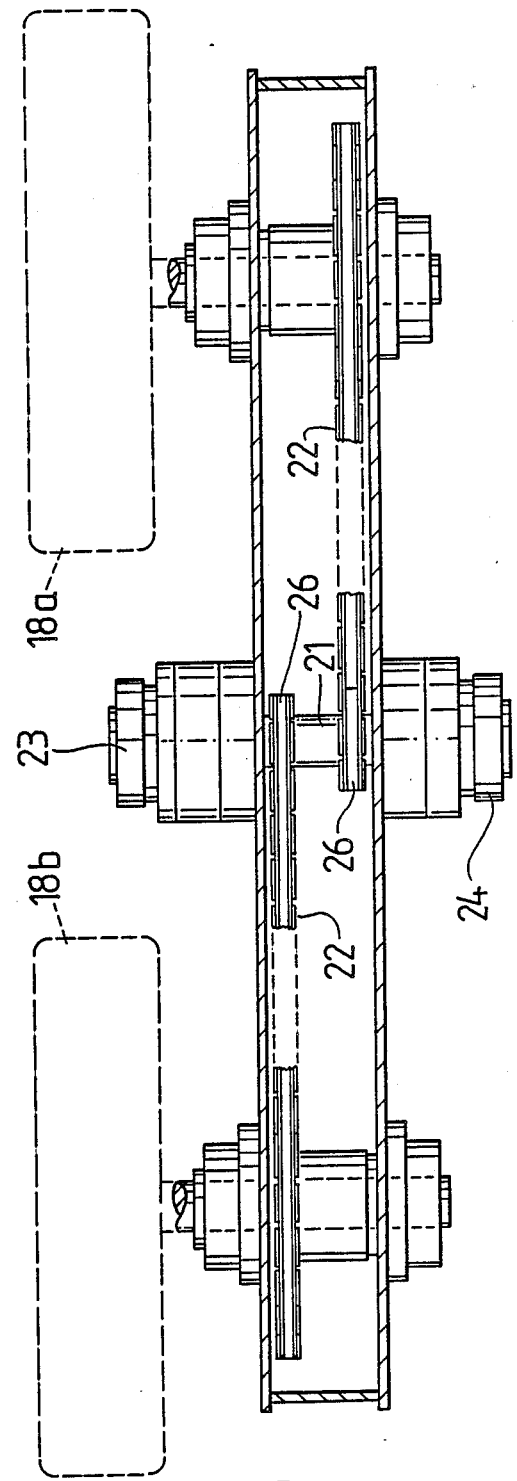
FIG. 2b is a sectional plan view of the mechanical coupling of a pair of motors to the drive shafts of their wheels.

FIGS. 2a and 2b show the internal workings of the gearboxes 17 which are provided for each side of the rear section 12. With reference to FIG. 2a, it may be seen that the forward wheel 18a and rear wheel 18b are each driven by identical sprockets 19 connected to a common shaft 21 by chains 22. The common shaft 21 is actually a connection between the output shafts of one pair of hydraulic motors 23 and 24. It may thus be seen that the paired hydraulic motors on each side are mechanically coupled by the shaft 21, which carries a double sprocket 26, thus the motors 23 and 24 on the left side of the rear section 12 must operate at the same speed and direction. Likewise motors 27 and 28, on the right side, are identically coupled to each other and must operate at the same speed and direction. In as much as the wheels 18 are mechanically connected to the shaft 21, each wheel of a pair of wheels is also driven synchronously with the other wheel of the pair.

The high speed or low speed operation of the drive system is selected by mechanical selector valves 31 and 32 which are depicted in FIG. 3. The valves 31 and 32 are mechanically linked to a single actuator 29, depicted herein as a shaft and handle, which may extend into the operator's compartment 14. The selector valves 31 and 32 are mechanically connected so that they are simultaneously positioned for either high speed or low speed operation. It will be appreciated that the actuator 29 may be other than a handle and shaft connection, so long as the valves 31 and 32 are mechanically coupled.

Figure 4:
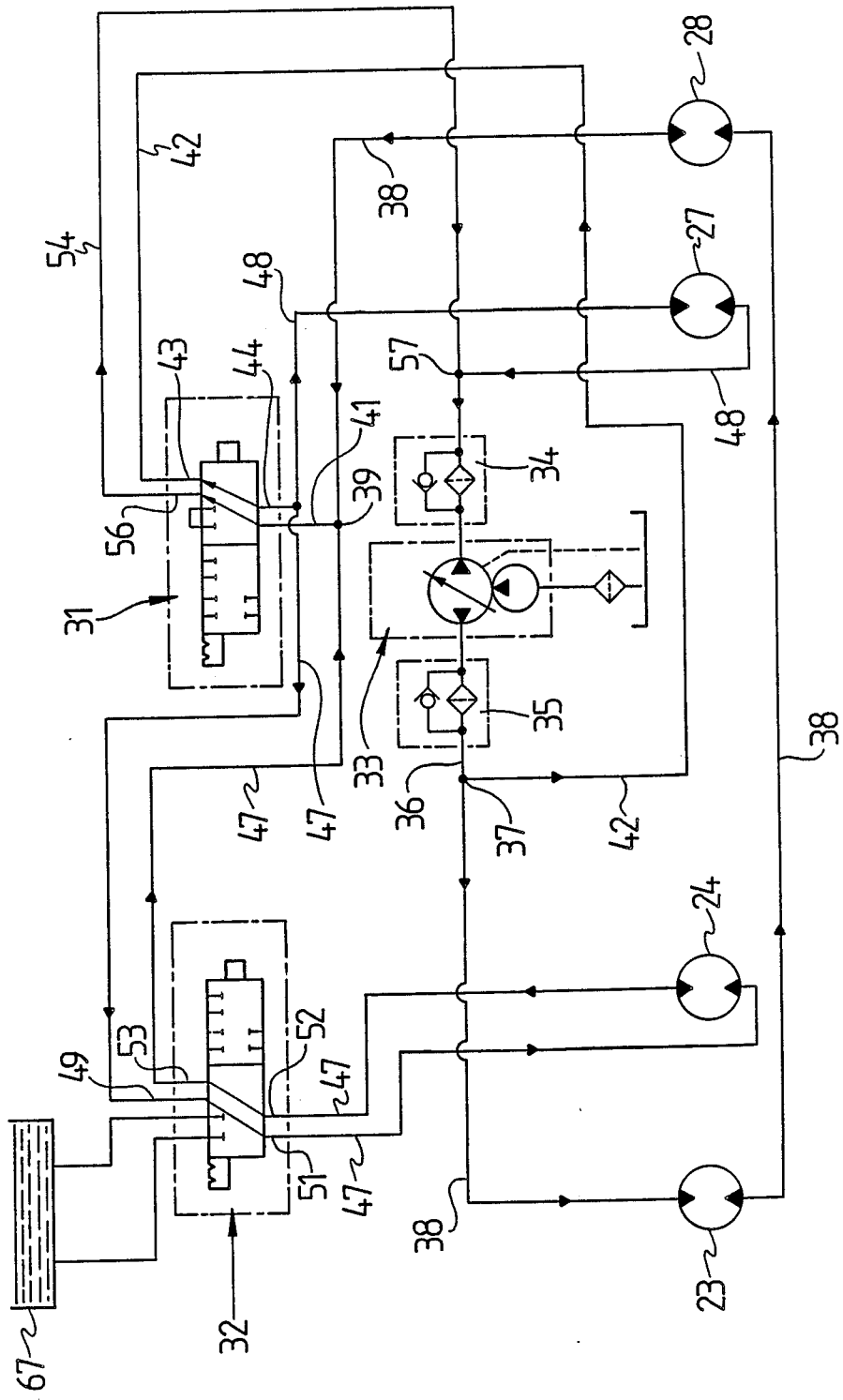
FIG. 4 is a schematic diagram of the hydraulic drive system in the low speed mode.

Referring to FIG. 4, the hydraulic drive system is shown with selector valves 31 and 32 positioned for low speed operation. Hydraulic fluid is driven through the system via hydraulic transmission 33 connected to input and output filters 34 and 35. An output hydraulic line 36 runs from filter 35 to a junction 37. From junction 37, a second hydraulic line 38 runs to left side motor 23 then to right side motor 28 and to a junction 39 at a fixed inlet 41 to selector valve 31. A second hydraulic line 42 runs from junction 37 to a selectable inlet 43 of selector valve 31, through selector valve 31 to a fixed outlet 44 of selector valve 31 and a junction 46. From the junction 46 a pair of parallel hydraulic lines 47 and 48 continue the circuit. Hydraulic line 47 runs to a selectable inlet 49 of selector valve 32 then to left side motor 24 from a fixed outlet 51 of the valve 32 and back to a fixed inlet 52 of valve 32. Hydraulic line 47 continues from a selectable outlet 53 to junction 39 where it joins serial line 38. A combined hydraulic line 54 runs from a selectable outlet 56 of valve 31 to a return junction 57. Parallel hydraulic line 48 runs from junction 46 through right side motor 27 to return juction 57. A return line 58 is connected between junction 57 and the filter 34. This hyraulic circuit will be formed each time the low speed mode is selected because the selectable inlet 43 and outlet 56 of valve 31 are mechanically coupled to the selectable inlet 49 and outlet 53 of valve 32.

As will be noted, left side motor 23 and right side motor 28 are in series, that is to say, hydraulic fluid is forced to flow through one motor and then the other, thus insuring that both motors operate at the same speed and direction. Left side motor 24 and right side motor 27 are connected in parallel from junction 46. Fluid in a parallel circuit normally follows the path of least resistance which would be undesirable in as much as the motor with the least resistance is the one that is slipping. Such action would cause the apparatus to stall due to insufficient force being supplied to the wheels that were not slipping. However, the left side motors 23 and 24 are mechanically coupled as are the right side motors 27 and 28. Since left side motor 23 and right side motor 28 are series connected and must operate at the same speed, then their mechanically coup-led partners, left side motor 24 and right side motor 27, must operate at the same speed and are caused to divide the hydraulic fluid equally, giving the advantage of extra power of a parallel hydraulic circuit while maintaining the drive system in a "lock-up" condition for absolute control or uneven or slippery surfaces. The drive may be operated in forward or reverse without changing the system.

Figure 5:
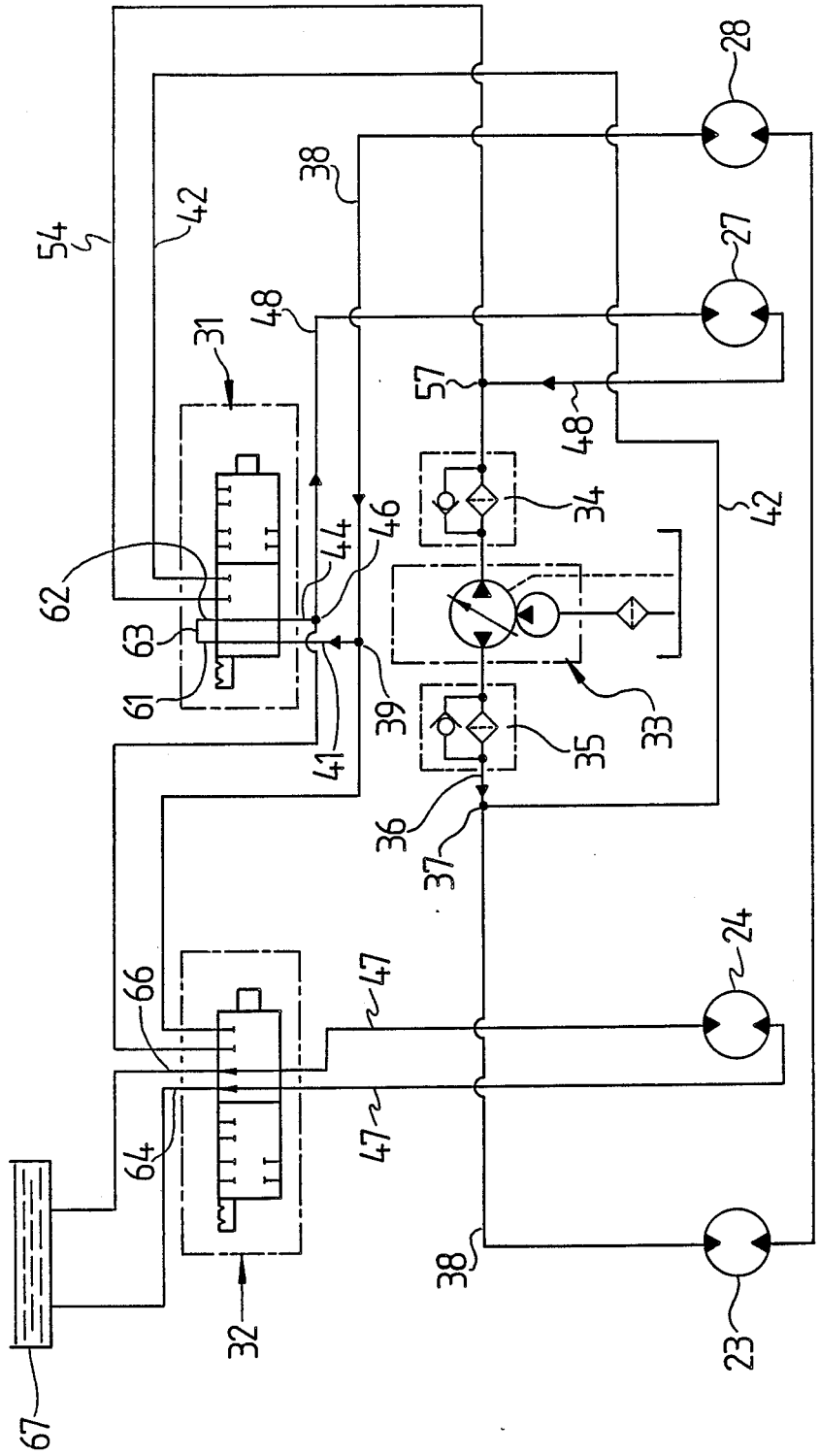
FIG. 5 is a schematic diagram of the hydraulic drive system in the high speed mode.

With reference to FIG. 5, the selector valves are schematically shown in position for high speed operation. In this mode, selector valve 31 has a second selectable outlet 61 and a second selectable inlet 62 connected by a loop 63 such that line 38 is connected directly through valve 31 to line 48, and lines 42 and 54 are closed at valve 31. Selector valve 32 also has a second selectable outlet 64 and selectable inlet 66 which are connected to a reservoir 67 of hydraulic fluid, such that the reservoir 67 is connected to left side motor 24 through valve 32 and a portion of line 47, however the remainder of line 47 connected to junctions 39 and 46 are closed at valve 32. As may be seen, in the high speed mode, left side motor 23, right side motor 28, and right side motor 27 are all in series and must operate at the same speed and in the same direction. Since the hydraulic fluid flows through them without being divided, the motors operate at a higher speed with decreased power. Left side motor 24 is not hydraulically driven but rather is driven by the mechanical coupling to left side motor 23. Lubrication and cooling for this motor 24 is provided by the valve 32 connection to a reservoir of hydraulic fluid which allows the fluid to be circulated therein by the action of motor 24 as it is mechanically driven. This action prevents the excessive and unacceptable heat build-up of prior art devices which allowed motors to turn or slip in static loops of fluid.

While I have shown my invention in one form, it will be obvious to those skilled in the art that it is not so limited but is susceptible of various changes and modifications without departing from the spirit thereof.

What I claim is:

1. A hydraulic drive system for a wheeled vehicle having an operator station wherein paired drive wheels are synchronously driven by a single hydraulic transmission comprising:
    (a) a first pair of hydraulic motors mechanically coupled for synchronous rotation and providing drive power to said drive wheels on one side of said vehicle through a mechanical linkage thereto;
    (b) a second pair of hydraulic motors mechanically coupled for synchronous rotation and providing drive power to said drive wheels on the other side of said vehicle;
    (c) conduit means connecting said hydraulic transmission and said hydraulic motors having selectable alternate flow paths including a first flow path wherein one of said first pair of hydraulic motors and one of said second pair of hydraulic motors are connected in series and said remaining hydraulic motors are connected in parallel and a second flow path wherein one of said first pair of hydraulic motors and both of said second pair of hydraulic motors are connected in series with the remaining hydraulic motor being driven through said mechanical coupling; and
    (d) selector means for selecting said first path or said second path.

2. The drive system as defined in claim 1 wherein said remaining hydraulic motor is connected to a reservoir of hydraulic fluid for lubrication and cooling when said second path is selected.

3. The drive system as defined in claim 1 wherein said conduit means comprises output conduit means connecting said transmission to one of said first pair of hydraulic motors and said selector means; series conduit means connecting said one of said first pair of hydraulic motors to one of said second pair of hydraulic motors, then to said selector means, then to said transmission; and parallel conduit means providing parallel connection from said selector means to the other one of said first pair of hydraulic motors and the other one of said second pair of hydraulic motors.

4. The drive system of claim 3 wherein said selector means comprises first valve means having a fixed input and a fixed output and a selectable pair of inputs and outputs, said fixed input connected in series with said first one of said first hydraulic motors and said fixed output connected to said other one of said first hydraulic motors; the first of said selectable outputs connected to the first of said selectable inputs, with the second selectable input connected from said hydraulic transmission and the second of said selectable outputs connected to said hydraulic transmission; second valve means having a fixed input and output connected to said other one of said second pair of hydraulic motors and a pair of selectable inputs and outputs including first selectable input and output connected to a reservoir of hydraulic fluid and a second selectable input connected to said fixed output of said first valve means in parallel with said other one of said first pair of hydraulic motors; and a second selectable output connected to said fixed input of said first valve menas, with said first and second valve means being mechanically linked such that the first selectable input and output of the first valve means are selected simultaneously with the first selectable input and output of said second valve means.

5. The system of claim 4 wherein said selector means further comprises an actuator accessible from said operator station for selectively positioning said valve means.

6. The drive system as defined in claim 4 wherein said remaining hydraulic motor is connected to a reservoir of hydraulic fluid for lubrication and cooling when said second path is selected.

7. The drive system of claim 1 wherein said selector means comprises first valve means having a fixed input and a fixed output and a selectable pair of inputs and outputs, said fixed input connected in series with said first one of said first hydraulic motors and said fixed output connected to said other one of said first hydraulic motors; the first said selectable outputs connected to the first of said selectable inputs, with the second selectable input connected from said hydraulic transmission and the second of said selectable outputs connected to said hydraulic transmission; second valve means having a fixed input and output connected to said other one of said second pair of hydraulic motors and a pair of selectable inputs and outputs including first selectable input and output connected to a reservoir of hydraulic fluid and a second selectable input connected to said fixed output of said first valve means in parallel with said other one of said first pair of hydraulic motors; and a second selectable output connected to said fixed input of said first valve means, with said first and second valve means being mechanically linked such that the first selectable input and output of the first valve means are selected simultaneously with the first selectable input and output of said second valve means.

8. The system of claim 1 wherein said selector means further comprises an actuator accessible from said operator station for selectively positioning said valve means.

* * * * *